United States Patent
Sun

(10) Patent No.: US 8,278,570 B2
(45) Date of Patent: Oct. 2, 2012

(54) INTELLECTUAL SCALE WITH A PLURALITY OF CHEMICAL MANAGEMENT MODES AND METHOD OF USING THE SAME

(75) Inventor: Kuan-Hung Sun, Kaohsiung (TW)

(73) Assignee: Ding Li Tong Technology Co., Ltd., Kaohsiung (TW)

( * ) Notice: Subject to any disclaimer, the term of this patent is extended or adjusted under 35 U.S.C. 154(b) by 374 days.

(21) Appl. No.: 12/650,133

(22) Filed: Dec. 30, 2009

(65) Prior Publication Data
US 2011/0056754 A1    Mar. 10, 2011

(30) Foreign Application Priority Data
Sep. 8, 2009  (TW) ................ 98130300 A

(51) Int. Cl.
*G01G 19/00*  (2006.01)
*G06Q 10/00*  (2006.01)

(52) U.S. Cl. ................... 177/25.13; 705/22; 705/28

(58) Field of Classification Search ............. 705/22, 705/28; 177/25.11–25.19
See application file for complete search history.

(56) References Cited

U.S. PATENT DOCUMENTS

| | | | | |
|---|---|---|---|---|
| 4,961,533 | A * | 10/1990 | Teller et al. | 177/25.19 |
| 7,630,790 | B2 * | 12/2009 | Handfield et al. | 700/236 |
| 7,747,477 | B1 * | 6/2010 | Louie et al. | 705/28 |
| 2006/0231109 | A1 * | 10/2006 | Howell et al. | 128/898 |
| 2006/0238346 | A1 * | 10/2006 | Teller | 340/572.1 |
| 2006/0241355 | A1 * | 10/2006 | Howell et al. | 600/300 |
| 2007/0024465 | A1 * | 2/2007 | Howell et al. | 340/870.01 |

* cited by examiner

*Primary Examiner* — Randy W Gibson
(74) *Attorney, Agent, or Firm* — WPAT, P.C.; Anthony King

(57) ABSTRACT

In an intellectual scale and a method of using same, a plurality of chemical management modes is provided. The intellectual scale can be switched to operate under any one of these chemical management modes to detect and measure a chemical to obtain the type and the weight of the chemical under the current chemical management mode, and record the obtained type and weight of the chemical, so that a user is able to know the use state of the chemical.

11 Claims, 5 Drawing Sheets

INTELLECTUAL SCALE WITH A PLURALITY OF CHEMICAL MANAGEMENT MODES AND METHOD OF USING THE SAME

FIELD OF THE INVENTION

The present invention relates to an intellectual scale and a method of using the intellectual scale. More particularly, the present invention relates to an intellectual scale that is able to record the type and weight of a chemical under different chemical management modes.

BACKGROUND OF THE INVENTION

In most of the existing laboratories, chemicals are usually stored in a chemical cabinet and freely accessible by any person in the labs who needs to use the chemicals. When the chemicals are no longer needed, the user simply puts the chemicals back in the chemical cabinet. However, no record will be made when any of the chemicals is running out and results in the embarrassing condition that the chemical is not available when some other user needs it.

Further, the chemicals in the labs are subject to the wet and accordingly deterioration due to natural or environmental factors. Public hazards might occur in the labs when some deteriorated chemicals are negligently used. Moreover, for some chemicals that might be hazardous to the environment or might be used to achieve illegal purposes, such as narcotics, it is prohibited to carry these chemicals out of the labs without authorization, and the use of such chemicals is under control of related governmental agencies. Each time such controlled chemicals are used and the used quantities thereof must be recorded and reported to relevant units in charge. A lot of complicated problems would occur when a user uses an excessive quantity of any of such controlled chemicals.

SUMMARY OF THE INVENTION

It is a primary object of the present invention to provide an intellectual scale and a method of using the intellectual scale, so that a user is able to perform good management of chemicals.

To achieve the above objects, the intellectual scale according to a preferred embodiment of the present invention includes a weighing unit, a wireless signal receiving unit, at least one key, and a control unit. The weighing unit measures a weight of a chemical and accordingly generates a measurement signal. And, the chemical to be measured is accommodated in a container which has a radio-frequency identification (RFID) tag attached thereto for generating a wireless signal. The wireless signal receiving unit receives the wireless signal and demodulates the received wireless signal into an identification signal. The at least one key is used to input a switch signal. The control unit receives the switch signal and switches to one of a plurality of chemical management modes comprised with the control unit based on the received switch signal. The control unit also identifies a type of the chemical according to the identification signal and obtains the weight of the chemical according to the measurement signal, and records the type of the chemical and the weight thereof corresponding to the switched chemical management mode under the chemical management modes.

The intellectual scale according to another preferred embodiment of the present invention includes a weighing unit, an identifying unit, at least one key, and a control unit. The weighing unit arranged for measuring a weight of a chemical and transmits a measurement signal; and the chemical to be measured is accommodated in a container which has a barcode provided thereon. The identifying unit arranged for identifying the barcode and accordingly generates an identification signal. The at least one key is used to input a switch signal. The control unit comprises a plurality of chemical management; the control unit receives the switch signal and switches to one of the chemical management modes based on the received switch signal. The control unit also identifies a type of the chemical according to the identification signal and obtaining the weight of the chemical according to the measurement signal. The control unit records the type of the chemical and the weight thereof corresponding to a current chemical management mode under the chemical management modes.

To achieve the above objects, the method of using an intellectual scale according to the present invention includes the steps of transmitting a switch signal to switch the intellectual scale to one of a plurality of chemical management modes; measuring a weight of a chemical to generate a measurement signal; identifying a type of the chemical to generate an identification signal; obtaining the type of the chemical and the weight thereof corresponding the switched chemical management mode via the identification signal and the measurement signal, respectively; and recording the type of the chemical and the corresponding weight thereof.

The intellectual scale according to the present invention may have one or more of the following advantages:

(1) The intellectual scale is able to record the type and the weight of the chemicals to thereby enhance the accuracy of management of chemicals.

(2) The intellectual scale is able to record the type and weight of a chemical under different chemical management modes, so as to know the use state of the chemical.

(3) The intellectual scale is a portable device to provide increased convenience in using the intellectual scale.

BRIEF DESCRIPTION OF THE DRAWINGS

The structure and the technical means adopted by the present invention to achieve the above and other objects can be best understood by referring to the following detailed description of the preferred embodiments and the accompanying drawings, wherein.

DETAILED DESCRIPTION OF THE PREFERRED EMBODIMENTS

Figure 1:
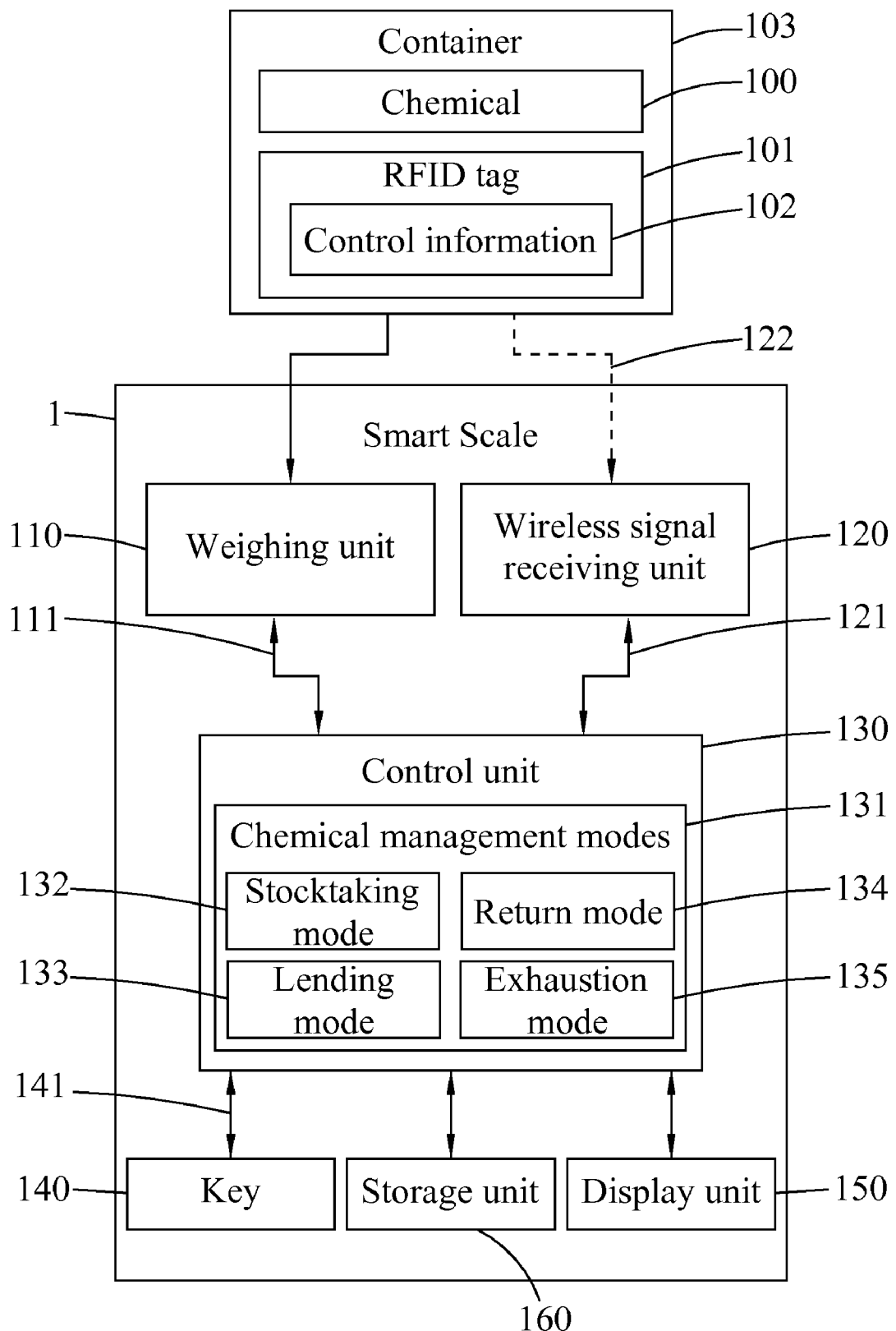
FIG. 1 is a block diagram of an intellectual scale according to a first embodiment of the present invention.

Please refer to FIG. 1 that is a block diagram of an intellectual scale 1 according to a first embodiment of the present invention. As shown, the intellectual scale 1 includes a weighing unit 110, a wireless signal receiving unit 120, at least one key 140, and a control unit 130. The weighing unit 110 measures a weight of a chemical 100, and generates a measurement signal 111 according to the measured weight of the chemical 100 is accommodated in a container 103. On the container 103, there is attached a radio-frequency identification (RFID) tag 101, which is used to transmit a wireless signal 122. The wireless signal receiving unit 120 receives the wireless signal 122 and demodulates the same into an identification signal 121, which includes classification information of the chemical 100. The key 140 is used to input a switch signal 141. The control unit 130 comprises a plurality of chemical management modes. The control unit 130 receives the switch signal 141 and operates under one of the chemical management modes 131 based on the received switch signal 141. Under each of the chemical management modes 131, the control unit 130 identifies a type of the chemical 100 according to the identification signal 121 and obtains the weight of the chemical 100 according to the measurement signal 111. And, the control unit 130 records the type of the chemical 100 and the weight thereof corresponding to the current chemical management mode 131 under the chemical modes. The process for weighing the chemical 100 will be elaborated in the following description. The weighing unit 110 actually weights weight of the chemical 100 and the container 103. An index of weight of the container 103 is setup within the control unit 130. When the control unit 130 receives the measurement signal 111 and obtains a sum weight of the chemical 100 and the container 103 according to the measurement signal 111. After that, the control unit 130 subtracts the index of weight of the container 103 from the sum weight, then the control unit 130 calculates the result of the weight of the chemical 100.

Further, depending on the type of the chemical 100, the RFID tag 101 attached to a controlled chemical 100 further includes control information 102 about the chemical 100, which is transmitted via the wireless signal 122. The intellectual scale 1 further includes a display unit 150 and a storage unit 160. The display unit 150 displays the type, the weight, the control information, and a use state of the chemical 100. The storage unit 160 stores the weight, the type, the control information and the use state of the chemical 100 under each of the chemical management modes 131 for browsing by users.

More specifically, the chemical management modes 131 include a stocktaking mode 132, a lending mode 133, a return mode 134, and an exhaustion mode 135. The following is a brief description of these four modes.

(A) Stocktaking Mode 132: When a user pushes the key 140 to switch the intellectual scale 1 to the stocktaking mode 132, the intellectual scale 1 can be used to weigh the weight of the chemical 100, the wireless signal receiving unit 120 receives the wireless signal 122 transmitted by the RFID tag 101, and the type and the weight of the chemical 100 are recorded.

(B) Lending Mode 133: When a user pushes the key 140 to switch the intellectual scale 1 to the lending mode 133, the user first weighs the chemical 100 with the intellectual scale 1, so that the weight of the chemical 100 before using is recorded. Meanwhile, the intellectual scale 1 identifies the type of the lent chemical 100 via the wireless receiving unit 120.

(C) Return Mode 134: When a user pushes the key 140 to switch the intellectual scale 1 to the return mode 134, the user first uses the intellectual scale 1 to weigh the returned chemical 100, so as to know the weight of the chemical 100 after using. Meanwhile, the intellectual scale 1 identifies the type of the returned chemical 100 via the wireless receiving unit 120.

(D) Exhaustion Mode 135: When a user pushes the key 140 to switch the intellectual scale 1 to the exhaustion mode 135, the intellectual scale 1 identifies via the wireless receiving unit 120 the type of the chemical 100 that has been used up and requires recovery or replenishment.

The control unit 130 also compares the chemical 100 under the lending mode 133 with the chemical 100 under the return mode 134 to record the use state of the chemical 100. Moreover, the intellectual scale 1 can be a compact, light, and convenient portable device for holding by a user with one hand to carry on the stocktaking of the chemical 100 freely.

Figure 2:
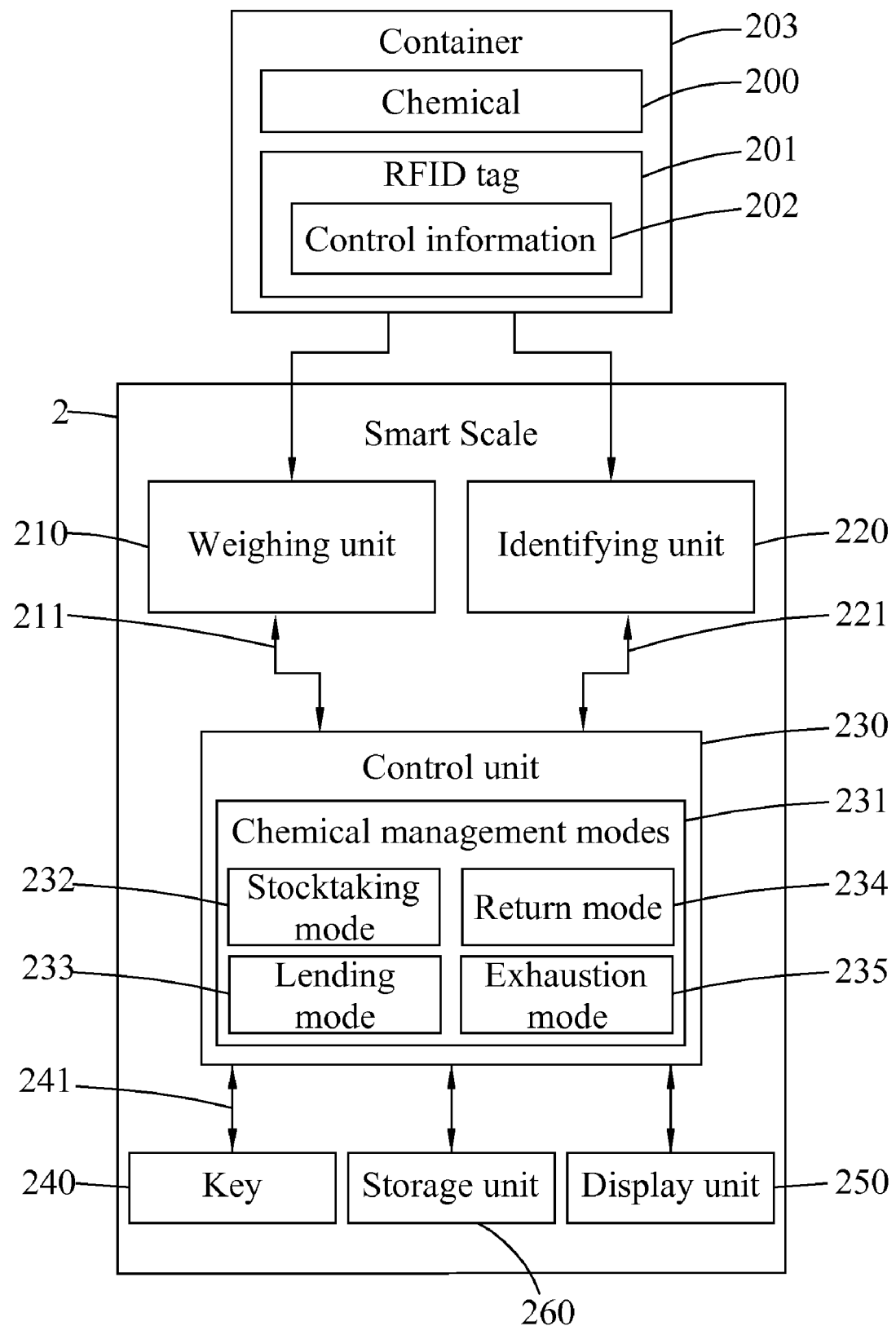
FIG. 2 is a block diagram of an intellectual scale according to a second embodiment of the present invention.

FIG. 2 is a block diagram of an intellectual scale 2 according to a second embodiment of the present invention. Some chemicals 200 are potentially hazardous or prone to deteriorate, and must be stored in a somewhat concealed and isolated place with stable environmental factors. Under this circumstance, it is possible the wireless signal could not be well received and transmitted at such concealed and isolated place to result in a useless wireless system. To overcome this situation, the intellectual scale 2 shown in FIG. 2 includes a weighing unit 210, an identifying unit 220, at least one key 240, and a control unit 230. The weighing unit 210 measures a weight of a chemical 200 and generates a measurement signal 211 according to the measured weight of the chemical 200. On each of the chemicals 200 is accommodated in a container 203 which has barcode 201. The identifying unit 220 scans the barcode 201 to generate an identification signal 221. More specifically, the identification signal 221 includes classification information of the chemical 200. The key 240 is used to input a switch signal 241. The control unit 230 comprises a plurality of chemical management modes 231; the control unit 230 receives the switch signal 241 and operates under one of the chemical management modes 231 according to the received switch signal 241. Under any one of the chemical management modes 231, the control unit 230 identifies a type of the chemical 200 according to the identification signal 221 and obtains the weight of the chemical 200 according to the measurement signal 211. And, the control unit 230 records the type of the chemical 200 and the weight thereof corresponding to the current chemical management mode 231 under the chemical modes 231. Thus, in the intellectual scale 2, the barcode 201 is used to replace the RFID tag to avoid the problem of poor signal receiving quality due to a concealed and isolated storage place for the chemical 200. The process for weighing the chemical 200 will be elaborated in the following description. The weighing unit 110 actually weights weight of the chemical 200 and the container 203. An index of weight of the container 203 is setup within the control unit 230. When the control unit 230 receives the measurement signal 211 and obtains a sum weight of the chemical 200 and the container 203 according to the measurement signal 211. After that, the control unit 230 subtracts the index of weight of the container 203 from the sum weight, then the control unit 230 calculates the result of the weight of the chemical 200.

Further, depending on the type of the chemical 200, the barcode 201 provided on a controlled chemical 200 further includes control information 202 about the chemical 200, which is identified by the identification unit 220. The intellectual scale 2 further includes a display unit 250 and a storage unit 260. The display unit 250 displays the type, the weight, the control information, and a use state of the chemical 200. The storage unit 260 stores the weight, the type, the control information and the use state of the chemical 200 under each of the chemical management modes 231 for browsing by users.

More specifically, the chemical management modes 231 include a stocktaking mode 232, a lending mode 233, a return mode 234, and an exhaustion mode 235. The following is a brief description of these four modes.

(A) Stocktaking Mode 232: When a user pushes the key 240 to switch the intellectual scale 2 to the stocktaking mode 232, the intellectual scale 2 can be used to weigh the weight of the chemical 200, the identification unit 220 identifies the barcode 201 on the chemical 200, and the type and the weight of the chemical 200 are recorded.

(B) Lending Mode 233: When a user pushes the key 240 to switch the intellectual scale 2 to the lending mode 233, the user first weighs the chemical 200 with the intellectual scale 2, so that the weight of the chemical 200 before using is recorded. Meanwhile, the intellectual scale 2 identifies the type of the lent chemical 200 via the identification unit 220.

(C) Return Mode 234: When a user pushes the key 240 to switch the intellectual scale 2 to the return mode 234, the user first uses the intellectual scale 2 to weigh the returned chemical 200, so that the intellectual scale 2 knows the weight of the chemical 200 after using. Meanwhile, the intellectual scale 2 identifies the type of the returned chemical 200 via the identification unit 220 that scans the barcode 201.

(D) Exhaustion Mode 235: When a user pushes the key 240 to switch the intellectual scale 2 to the exhaustion mode 235, the intellectual scale 2 identifies via the identification unit 220 the type of the chemical 200 that has been used up and requires recovery or replenishment.

The control unit 230 also compares the chemical 200 under the lending mode 233 with the chemical 200 under the return mode 234 to record the use state of the chemical 200. Moreover, the intellectual scale 2 can be a compact, light, and convenient portable device for holding by a user with one hand to carry on the stocktaking of the chemical 200 freely, making the intellectual scale 2 more convenient for use.

Figure 3:
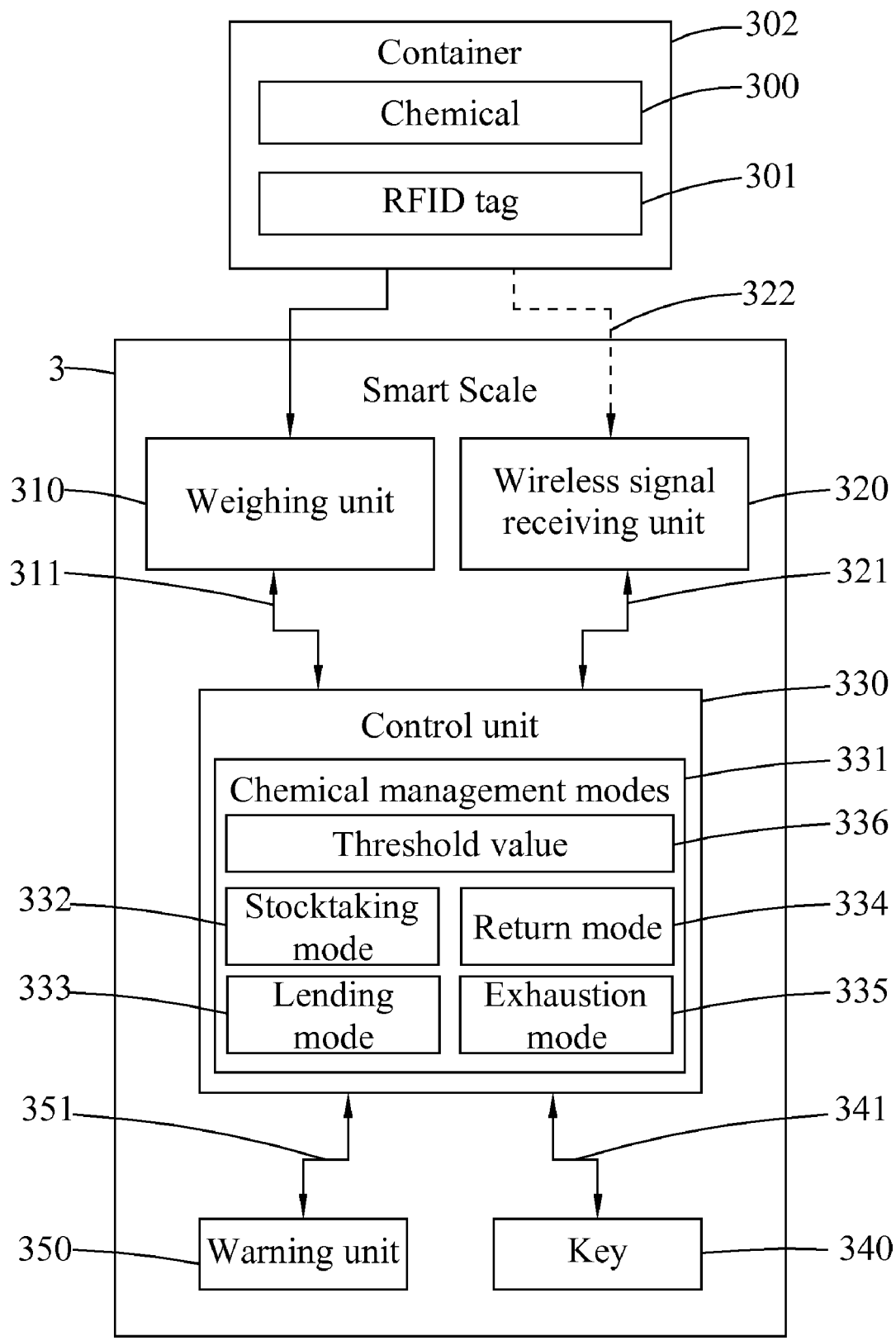
FIG. 3 is a block diagram of an intellectual scale according to a third embodiment of the present invention.

FIG. 3 is a block diagram of an intellectual scale 3 according to a third embodiment of the present invention. As shown, the intellectual scale 3 includes a weighing unit 310, a wireless signal receiving unit 320, at least one key 340, and a control unit 330. The weighing unit 310 measures a weight of a chemical 300 which accommodated in a container 302, and the weighing unit 310 generates a measurement signal 311 according to the measured weight of the chemical 300. On the container 302, there is attached an RFID tag 301, which is used to transmit a wireless signal 322. The wireless signal receiving unit 320 receives the wireless signal 322 and generates an identification signal 321 based on the received wireless signal 322. In the present invention, the adopted wireless technique includes, but not limited to, the RFID technique or the Bluetooth transmission technique. The key 340 is used to input a switch signal 341. The control unit 330 is internally built a plurality of chemical management modes 331. When receiving the switch signal 341, the control unit 330 operates under one of the chemical management modes 331 based on the received switch signal 341. Under any of the chemical management modes 331, the control unit 330 identifies the type of the chemical 300 according to the identification signal 321 and obtains the weight of the chemical 300 according to the measurement signal 311. And, the control unit 330 records the type of the chemical 300 and the weight thereof corresponding to the current chemical management mode 331 under the chemical modes 331.

More specifically, the chemical management modes 331 include a stocktaking mode 332, a lending mode 333, a return mode 334, and an exhaustion mode 335. The following is a brief description of these four modes.

(A) Stocktaking Mode 332: When a user pushes the key 340 to switch the intellectual scale 3 to the stocktaking mode 332, the intellectual scale 3 can be used to weigh the weight of the chemical 300, the wireless signal receiving unit 320 receives the wireless signal 322 transmitted by the RFID tag 301, and the type and the weight of the chemical 300 are recorded.

(B) Lending Mode 333: When a user pushes the key 340 to switch the intellectual scale 3 to the lending mode 333, the user first weighs the lent chemical 300 with the intellectual scale 3, so that the weight of the chemical 300 before using is recorded. Meanwhile, the intellectual scale 3 identifies the type of the lent chemical 300 via the wireless receiving unit 320.

(C) Return Mode 334: When a user pushes the key 340 to switch the intellectual scale 3 to the return mode 334, the user first uses the intellectual scale 3 to weigh the returned chemical 300, so that the intellectual scale 3 knows the weight of the chemical 300 after using. Meanwhile, the intellectual scale 3 identifies the type of the returned chemical 300 via the wireless receiving unit 320.

(D) Exhaustion Mode 335: When a user pushes the key 340 to switch the intellectual scale 3 to the exhaustion mode 335, the intellectual scale 3 identifies via the wireless receiving unit 320 the type of the chemical 300 that has been used up and requires recovery or replenishment.

The control unit 330 also compares the chemical 300 under the lending mode 333 with the chemical 300 under the return mode 334 to record the use state of the chemical 300. It is noted the control unit 330 further includes an internally built threshold value 336. When a difference between the weight of the chemical 300 before using and after using is relatively high and exceeds the threshold value 336, the control unit 330 transmits a warning signal 351 to a warning unit 350 to remind the user returning the chemical 300 of any possibility that an incorrect chemical 300 has been returned or the chemical 300 has a dramatically reduced volume due to any leakage thereof. Moreover, the intellectual scale 3 can be a compact, light, and convenient portable device for holding by a user with one hand to carry on the stocktaking of the chemical 300 freely.

Figure 4:
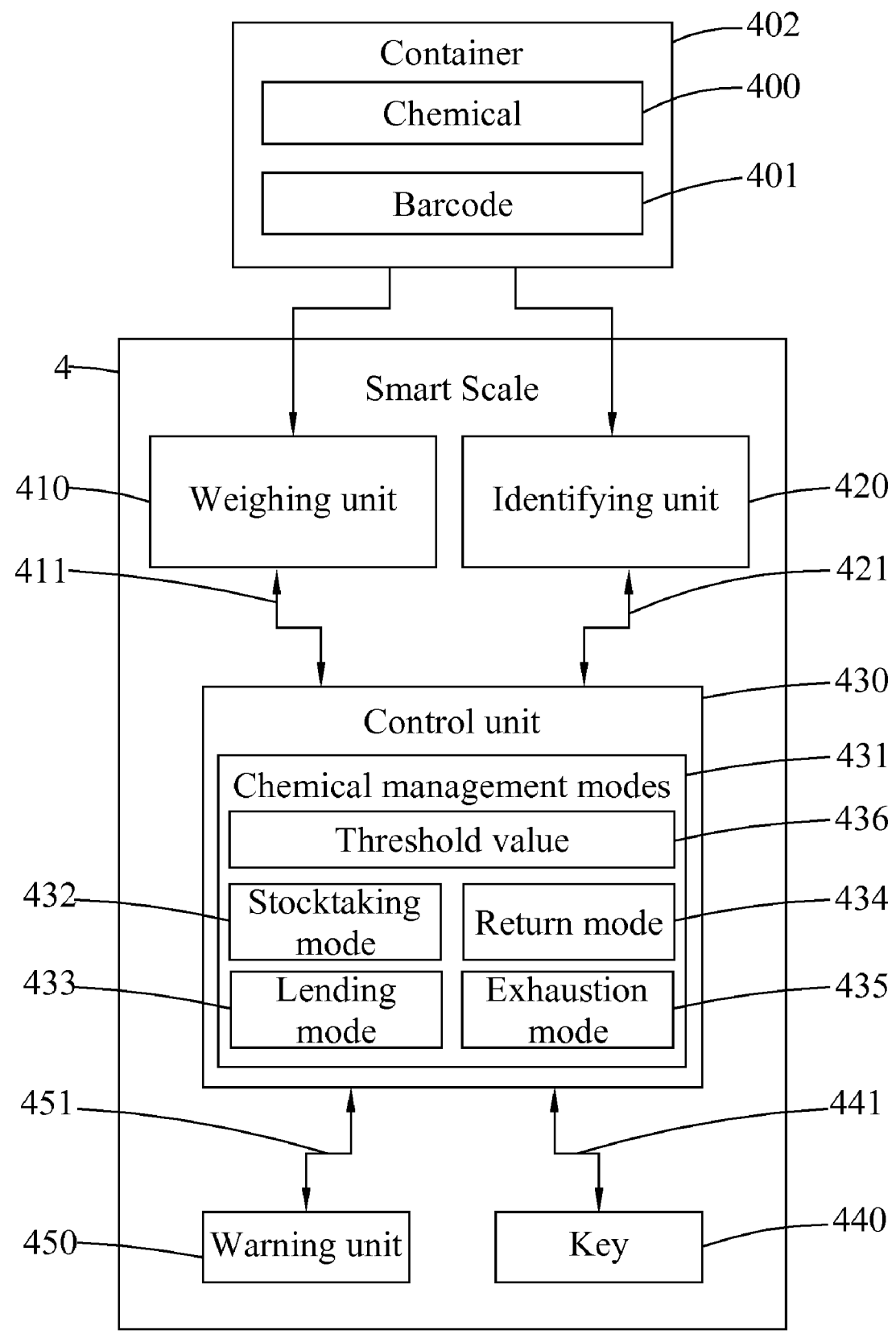
FIG. 4 is a block diagram of an intellectual scale according to a fourth embodiment of the present invention.

FIG. 4 is a block diagram of an intellectual scale 4 according to a fourth embodiment of the present invention. As shown, the intellectual scale 4 includes a weighing unit 410, an identifying unit 420, at least one key 440, and a control unit 430. The weighing unit 410 measures a chemical 400 which accommodated in a container 402. A barcode 401 is attached on the container 402. The weighing unit 410 measures a weight of the chemical 400 and generates a measurement signal 411 according to the measured weight of the chemical 400. The identifying unit 420 scans the barcode 401 to generate an identification signal 421. More specifically, the identification signal 421 includes classification information of the chemical 400. The key 440 is used to input a switch signal 441. The control unit 430 is internally built a plurality of chemical management modes 431. When receiving the switch signal 441, the control unit 430 switches to one of the chemical management modes 431 according to the received switch signal 441. Under any of the chemical management modes 431, the control unit 430 identifies a type of the chemical 400 according to the identification signal 421 and obtains the weight of the chemical 400 according to the measurement signal 411. And, the control unit 430 records the type of the chemical 400 and the weight thereof corresponding to the current chemical management mode 431 under the chemical management modes 431. Thus, in the intellectual scale 4, the barcode 401 is used to replace the RFID tag to avoid the problem of poor signal receiving quality due to a concealed and isolated storage place for the chemical 400.

More specifically, the chemical management modes 431 include a stocktaking mode 432, a lending mode 433, a return mode 434, and an exhaustion mode 435. The following is a brief description of these four modes.

(A) Stocktaking Mode 432: When a user pushes the key 440 to switch the intellectual scale 4 to the stocktaking mode 432, the intellectual scale 4 can be used to weigh the weight of the chemical 400, the identification unit 420 identifies the barcode 401 on the chemical 400, and the type and the weight of the chemical 400 are recorded.

(B) Lending Mode 433: When a user pushes the key 440 to switch the intellectual scale 4 to the lending mode 433, the user first weighs the lent chemical 400 with the intellectual scale 4, so that the weight of the chemical 400 before using is recorded. Meanwhile, the intellectual scale 4 identifies the type of the lent chemical 400 via the identification unit 420.

(C) Return Mode 434: When a user pushes the key 440 to switch the intellectual scale 4 to the return mode 434, the user first uses the intellectual scale 4 to weigh the returned chemical 400, so that the intellectual scale 4 knows the weight of the chemical 400 after using. Meanwhile, the intellectual scale 4 identifies the type of the returned chemical 400 via the identification unit 420 that scans the barcode 401.

(D) Exhaustion Mode 435: When a user pushes the key 440 to switch the intellectual scale 4 to the exhaustion mode 435, the intellectual scale 4 identifies via the identification unit 420 the type of the chemical 400 that has been used up and requires recovery or replenishment.

The control unit 430 also compares the chemical 400 under the lending mode 433 with the chemical 400 under the return mode 434 to record the use state of the chemical 400. It is noted the control unit 430 further includes an internally built threshold value 436. When a difference between the weight of the chemical 400 before using and after using is relatively high and exceeds the threshold value 436, the control unit 430 transmits a warning signal 451 to a warning unit 450 to remind the user returning the chemical 400 of any possibility that an incorrect chemical 400 has been returned or the chemical 400 has a dramatically reduced volume due to any leakage thereof. Moreover, the intellectual scale 4 can be a compact, light, and convenient portable device for holding by a user with one hand to carry on the stocktaking of the chemical 400 freely, making the intellectual scale 4 more convenient for use.

Figure 5:
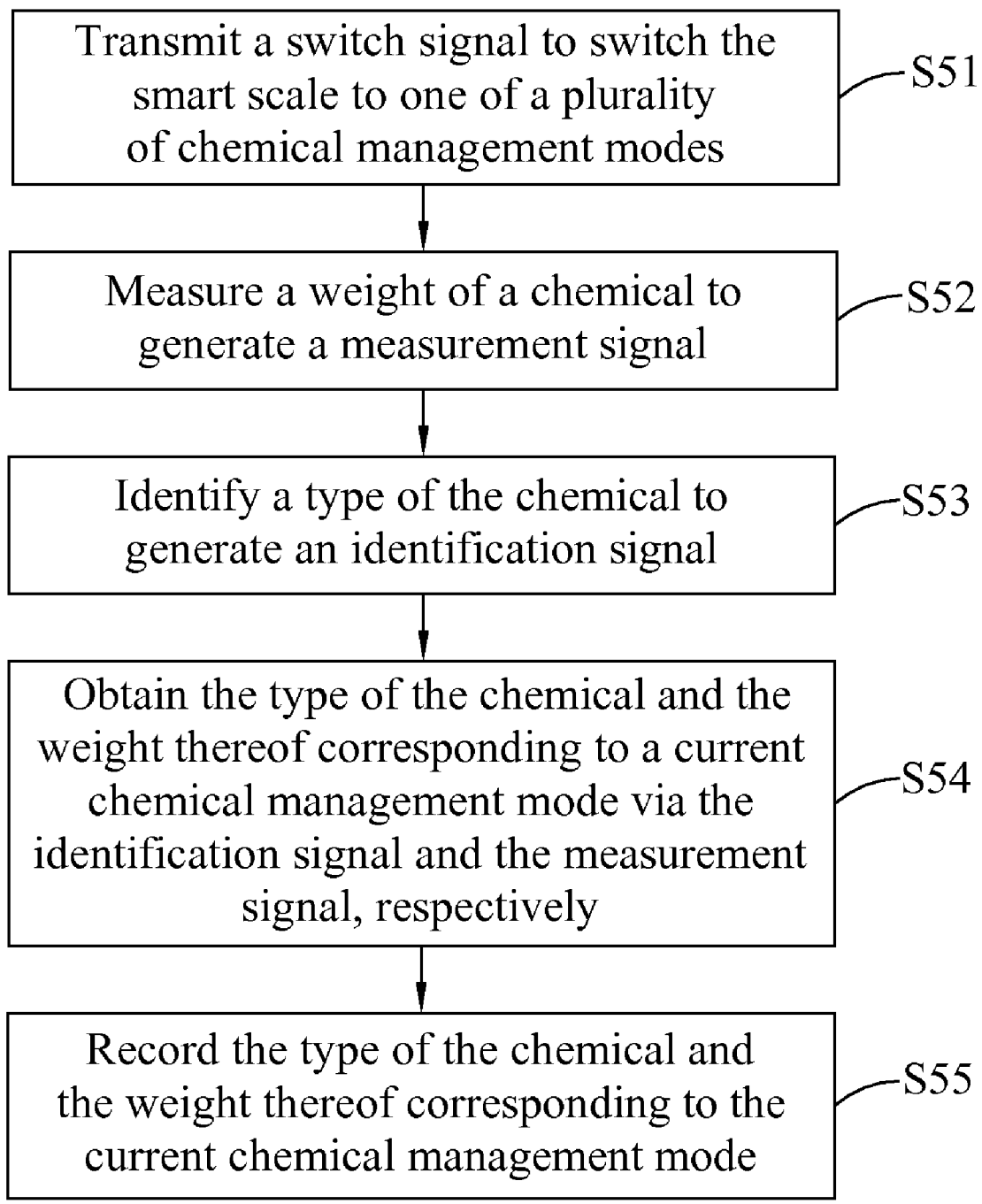
FIG. 5 is a flowchart showing the steps included in a method of using an intellectual scale according to the present invention.

Please refer to FIG. 5, which is a flowchart showing the steps included in a method of using an intellectual scale according to the present invention. As shown, the method of using an intellectual scale includes the following steps:

S51: Transmit a switch signal to switch the intellectual scale to one of a plurality of chemical management modes;

S52: Measure a weight of a chemical to generate a measurement signal;

S53: Identify a type of the chemical to generate an identification signal;

S54: Obtain the type of the chemical and the weight thereof corresponding to a current chemical management mode via the identification signal and the measurement signal, respectively; and S55: Record the type of the chemical and the weight thereof corresponding to the current chemical management mode.

In the present invention, either an RFID tag is attached to a container accommodating the chemical or a barcode is printed on the container accommodating the chemical for identifying the type of the chemical. It is noted the control unit of the intellectual scale can be switched to any one of four different chemical management modes, namely, a stocktaking mode, a lending mode, a return mode, and an exhaustion mode. In the stocktaking mode, the chemical can be checked for its remaining quantity; in the lending mode, the conditions of the chemical at the time of being lent for use are recorded; in the return mode, the conditions of the chemical at the time of being returned are recorded; and in the exhaustion mode, the exhaustion of the chemical is recorded.

The present invention has been described with some preferred embodiments thereof and it is understood that many changes and modifications in the described embodiments can be carried out without departing from the scope and the spirit of the invention that is intended to be limited only by the appended claims.

What is claimed is:

1. An intellectual scale with a plurality of chemical management modes, comprising:
a weighing unit arranged for measuring a weight of a chemical and generating a measurement signal; and the chemical being measured is accommodated in a container which has a radio-frequency identification (RFID) tag attached thereto for generating a wireless signal;
a wireless signal receiving unit arranged for receiving the wireless signal and demodulating the received wireless signal into an identification signal;
at least one key being used to input a switch signal; and
a control unit with the chemical management modes, wherein the chemical management modes include: a stocktaking mode, under which the control unit checking and recording the type and a remaining quantity of the chemical; a lending mode, under which the control unit recording conditions of the chemical at the time of being lent for use; a return mode, under which the control unit recording conditions of the lent chemical at the time of being returned; an exhaustion mode, under which the control unit recording an exhaustion condition of the chemical; the control unit receiving the switch signal and switching to one of the chemical management modes based on the received switch signal; and the control unit also identifying a type of the chemical according to the identification signal and obtaining the weight of the chemical according to the measurement signal; further the control unit recording the type of the chemical and the weight thereof corresponding to a current chemical management mode under the chemical management modes, wherein the control unit compares the chemical under the lending mode with the chemical under the return mode to thereby record a use state of the chemical, and the control unit comprises an internally built threshold value, wherein the control unit transmits a warning signal to a warning unit when a difference between the weight of the chemical before using and after using exceeds the threshold value.

2. The intellectual scale with a plurality of chemical management modes as claimed in claim 1, wherein the RFID tag further includes control information of the chemical when the chemical is a type of controlled chemical, and the control information being transmitted via the wireless signal.

3. The intellectual scale with a plurality of chemical management modes as claimed in claim 2, further comprising a storage unit for storing the type, the weight, the control information and the use state of the chemical.

4. The intellectual scale with a plurality of chemical management modes as claimed in claim 2, further comprising a display unit for displaying the type, the weight, the control information and the use state of the chemical.

5. An intellectual scale with a plurality of chemical management modes, comprising:
a weighing unit arranged for measuring a weight of a chemical and transmitting a measurement signal; and the chemical is accommodated in a container which has a barcode provided thereon;

an identifying unit arranged for identifying the barcode and generating an identification signal;

at least one key being used to input a switch signal; and a control unit with the chemical management modes, wherein the chemical management modes include: a stocktaking mode, under which the control unit checking and recording the type and a remaining quantity of the chemical; a lending mode, under which the control unit recording conditions of the chemical at the time of being lent for use; a return mode, under which the control unit recording conditions of the lent chemical at the time of being returned; an exhaustion mode, under which the control unit recording an exhaustion condition of the chemical; the control unit receiving the switch signal and switching to one of the chemical management modes based on the received switch signal; the control unit also identifying a type of the chemical according to the identification signal and obtaining the weight of the chemical according to the measurement signal; further the control unit recording the type of the chemical and the weight thereof corresponding to a current chemical management mode under the chemical management modes, wherein the control unit compares the chemical under the lending mode with the chemical under the return mode to thereby record a use state of the chemical, and the control unit comprises an internally built threshold value, wherein the control unit transmits a warning signal to a warning unit when a difference between the weight of the chemical before using and after using exceeds the threshold value.

6. The intellectual scale with a plurality of chemical management modes as claimed in claim 5, wherein the barcode further includes control information of the chemical when the chemical is a type of controlled chemical.

7. The intellectual scale with a plurality of chemical management modes as claimed in claim 6, further comprising a storage unit for storing the type, the weight, the control information and the use state of the chemical.

8. The intellectual scale with a plurality of chemical management modes as claimed in claim 6, further comprising a display unit for displaying the type, the weight, the control information and the use state of the chemical.

9. A method of using an intellectual scale with a plurality of chemical management modes, comprising the following steps:

transmitting a switch signal to switch the intellectual scale to one of the chemical management modes, wherein the chemical management modes include: a stocktaking mode, under which the control unit checking and recording the type and a remaining quantity of the chemical; a lending mode, under which the control unit recording conditions of the chemical at the time of being lent for use; a return mode, under which the control unit recording conditions of the lent chemical at the time of being returned; an exhaustion mode, under which the control unit recording an exhaustion condition of the chemical;

measuring a weight of a chemical to generate a measurement signal;

identifying a type of the chemical to generate an identification signal;

obtaining the type of the chemical and the weight thereof corresponding the current chemical management mode via the identification signal and the measurement signal, respectively; and recording the type of the chemical and the weight thereof corresponding to the current chemical management mode, wherein the control unit compares the chemical under the lending mode with the chemical under the return mode to thereby record a use state of the chemical, and the control unit comprises an internally built threshold value, wherein the control unit transmits a warning signal to a warning unit when a difference between the weight of the chemical before using and after using exceeds the threshold value.

10. The method of using an intellectual scale with a plurality of chemical management modes as claimed in claim 9, further comprising the step of attaching an RFID tag to a container accommodating the chemical for identifying the type of the chemical.

11. The method of using an intellectual scale with a plurality of chemical management modes as claimed in claim 9, further comprising the step of printing a barcode on a container accommodating the chemical for identifying the type of the chemical.

* * * * *